United States Patent
Iida (10) Patent No.: US 12,188,955 B2
(45) Date of Patent: Jan. 7, 2025

(54) REAGENT CARTRIDGE AND AUTOMATIC ANALYZING DEVICE

(71) Applicant: CANON MEDICAL SYSTEMS CORPORATION, Otawara (JP)

(72) Inventor: Shin Iida, Ota-ku (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 250 days.

(21) Appl. No.: 17/470,399

(22) Filed: Sep. 9, 2021

(65) Prior Publication Data
US 2022/0074961 A1    Mar. 10, 2022

(30) Foreign Application Priority Data

Sep. 9, 2020   (JP) ................................. 2020-150941
Sep. 7, 2021   (JP) ................................. 2021-145120

(51) Int. Cl.
*G01N 35/10* (2006.01)

(52) U.S. Cl.
CPC ..... *G01N 35/1002* (2013.01); *G01N 35/1016* (2013.01)

(58) Field of Classification Search
CPC ........... G01N 35/1002; G01N 35/1016; G01N 35/00; G01N 35/00584; G01N 35/025; G01N 35/1004; G01N 35/1009; G01N 2035/00534; G01N 2035/1025; B01L 3/0293; B01L 2400/0481; B01L 3/523
See application file for complete search history.

(56) References Cited

U.S. PATENT DOCUMENTS

| | | | | |
|---|---|---|---|---|
| 5,318,204 A | * | 6/1994 | Davis ................. | B65D 83/0055 222/481.5 |
| 6,193,933 B1 | | 2/2001 | Sasaki et al. | |
| 2008/0237266 A1 | * | 10/2008 | Ciavarella ............. | B05B 7/0025 222/190 |
| 2012/0193376 A1 | | 8/2012 | Evans et al. | |
| 2014/0284358 A1 | | 9/2014 | Evans et al. | |
| 2014/0377132 A1 | * | 12/2014 | Shimase ............ | G01N 35/1004 422/67 |
| 2020/0360919 A1 | * | 11/2020 | Guzman ............... | B01L 3/0217 |

FOREIGN PATENT DOCUMENTS

| JP | H0730944 Y2 * | 7/1995 |
|---|---|---|
| JP | 11-258243 A | 9/1999 |
| JP | 2012-159503 A | 8/2012 |

* cited by examiner

*Primary Examiner* — Jill A Warden
*Assistant Examiner* — John McGuirk
(74) *Attorney, Agent, or Firm* — Oblon, McClelland, Maier & Neustadt, L.L.P.

(57) ABSTRACT

A reagent cartridge according to an embodiment includes a housing part, a tubular member, and a dispense part. The housing part houses therein a reagent. The tubular member is filled with the reagent housed in the housing part. The dispense part dispenses the reagent supplied from the tubular member. The tubular member has elasticity, and supplies the reagent to the dispense part when a side face part thereof is compressed.

13 Claims, 13 Drawing Sheets

REAGENT CARTRIDGE AND AUTOMATIC ANALYZING DEVICE

CROSS-REFERENCE TO RELATED APPLICATIONS

This application is based upon and claims the benefit of priority from Japanese Patent Application No. 2020-150941, filed on Sep. 9, 2020; and Japanese Patent Application No. 2021-145120, filed on Sep. 7, 2021, the entire contents of which are incorporated herein by reference.

FIELD

Embodiments described herein relate generally to a reagent cartridge and an automatic analyzing device.

BACKGROUND

For example, in an automatic analysis system, a dispenser probe attached to a dispenser arm is moved between a reagent container and a reaction cuvette by rotating and moving up and down the dispenser arm, and a pump is driven to cause the dispenser probe to dispense a reagent. That is, the dispenser probe is caused to aspirate the reagent in the reagent container and to dispense the reagent to the reaction cuvette. As described, in the automatic analyzing device, the dispensing accuracy of the reagent is secured by the dispenser probe, the dispenser arm, and the pump.

DETAILED DESCRIPTION

A reagent cartridge according to an embodiment includes a housing part, a tubular member, and a dispense part. The housing part houses therein a reagent. The tubular member is filled with the reagent housed in the housing part. The dispense part dispenses the reagent supplied from the tubular member. The tubular member has elasticity, and supplies the reagent to the dispense part when a side face part thereof is compressed.

Hereinafter, an embodiment of an automatic analyzing device will be described in detail with reference to the drawings. Note that embodiments are not limited to the embodiment described hereinafter. Furthermore, in principle, the content described in one embodiment is applied also to other embodiments.

Figure 1:
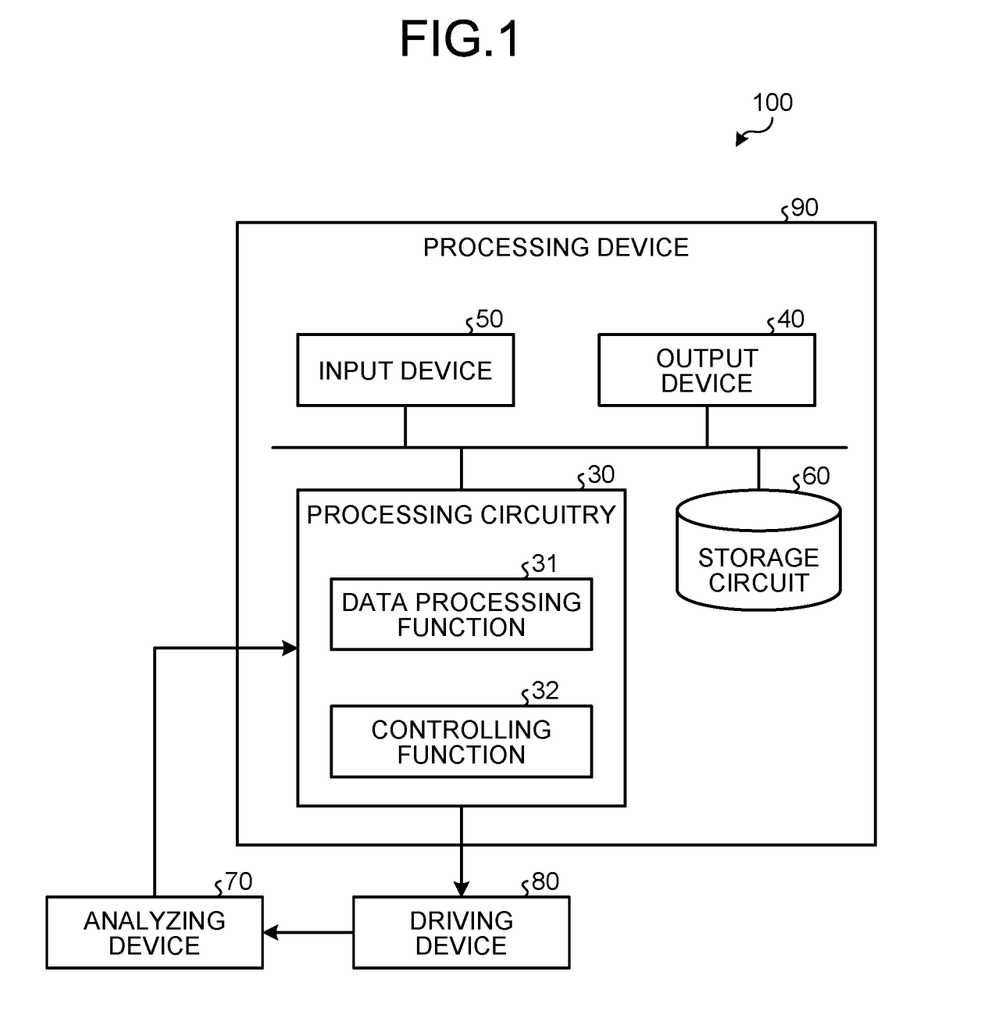
FIG. 1 is a block diagram illustrating an example of a configuration of an automatic analyzing device to which a reagent cartridge according to an embodiment is applied.

FIG. 1 is a block diagram illustrating an example of a configuration of an automatic analyzing device 100 according to the embodiment. The automatic analyzing device 100 illustrated in FIG. 1 includes an analyzing device 70, a driving device 80, and a processing device 90.

The analyzing device 70 measures a liquid mixture of a standard sample of each inspection item or a test sample (a biological sample such as blood or urine) collected from a subject, and a reagent used for analysis of each inspection item to generate standard data and test data. The analyzing device 70 includes a plurality of units that perform dispensing of samples, dispensing of reagents, and the like, and the driving device 80 drives each of the units of the analyzing device 70. The processing device 90 controls the driving device 80 to operate each of the units of the analyzing device 70.

The processing device 90 includes an input device 50, an output device 40, a processing circuitry 30, and a storage circuit 60.

The input device 50 includes an input device such as a keyboard, a mouse, a button, or a touch key panel for entering input for setting analysis parameters of the inspection items, input for setting test identification information and inspection items of a test sample, and the like.

The output device 40 includes a printer and a display. The printer prints data generated by the processing circuitry 30. The display is a monitor such as a cathode ray tube (CRT) or a liquid crystal panel, and displays the data generated by the processing circuitry 30.

The storage circuit 60 is a semiconductor memory element such as a random-access memory (RAM) or a flash memory, or a memory device such as a hard disk or an optical disc.

The processing circuitry 30 controls the entire system. For example, as illustrated in FIG. 1, the processing circuitry 30 executes a data processing function 31 and a controlling function 32. The controlling function 32 controls the driving device 80 to operate each of the units of the analyzing device 70. Note here that the controlling function 32 is an example of a controlling unit. The data processing function 31 processes the standard data and the test data generated by the analyzing device 70 to generate calibration data and analysis data of each of the inspection items.

For example, the standard data generated by the analyzing device 70 represents data (a calibration curve or a standard curve) for determining an amount and density of a substance, and the test data generated by the analyzing device 70 represents data of a result acquired by measuring a test sample. Furthermore, the calibration data output from the processing circuitry 30 represents data indicating a measurement result, such as the amount and density of the substance, derived from the test data and the standard data, and the analysis data output from the processing circuitry 30 represents data indicating a determination result regarding positive or negative. That is, the calibration data is the data for deriving the analysis data indicating the determination result regarding positive or negative.

Note here that each of the processing functions executed by structural elements of the processing circuitry 30, for example, is recorded in the storage circuit 60 in a form of computer programs that can be executed by a computer. The processing circuitry 30 is a processor that reads out and executes each of the computer programs from the storage circuit 60 to implement the functions corresponding to the respective computer programs. In other words, the processing circuitry 30 comes to have each of the processing functions illustrated in the processing circuitry 30 of FIG. 1 when reading out each of the computer programs.

While it is described by referring to FIG. 1 that the following processing functions are implemented by a single processing circuitry 30, a plurality of independent processors may be combined to configure the processing circuitry and the functions may be implemented by executing the computer programs by each of the processors.

The term "processor" used in the explanation means a circuit such as a central processing unit (CPU), a graphics processing unit (GPU), an application specific integrated Circuit (ASIC), a programmable logic device (for example, a simple programmable logic device: SPLD), a complex programmable logic device (CPLD), a field-programmable gate array (FPGA), or the like, for example. When the processor is a CPU, for example, the processor implements the functions by reading out and executing the computer programs saved in the storage circuit 60. In the meantime, when the processor is an ASIC, for example, the computer programs are directly incorporated into the circuit of the processor instead of saving the computer programs in the storage circuit 60. Note that each of the processors of the embodiment is not limited to being configured as a single circuit for each processor but may be configured as a single processor by combining a plurality of independent circuits to implement the functions thereof. Furthermore, a plurality of structural elements illustrated in FIG. 1 may be integrated into a single processor to implement the functions thereof.

Figure 2:
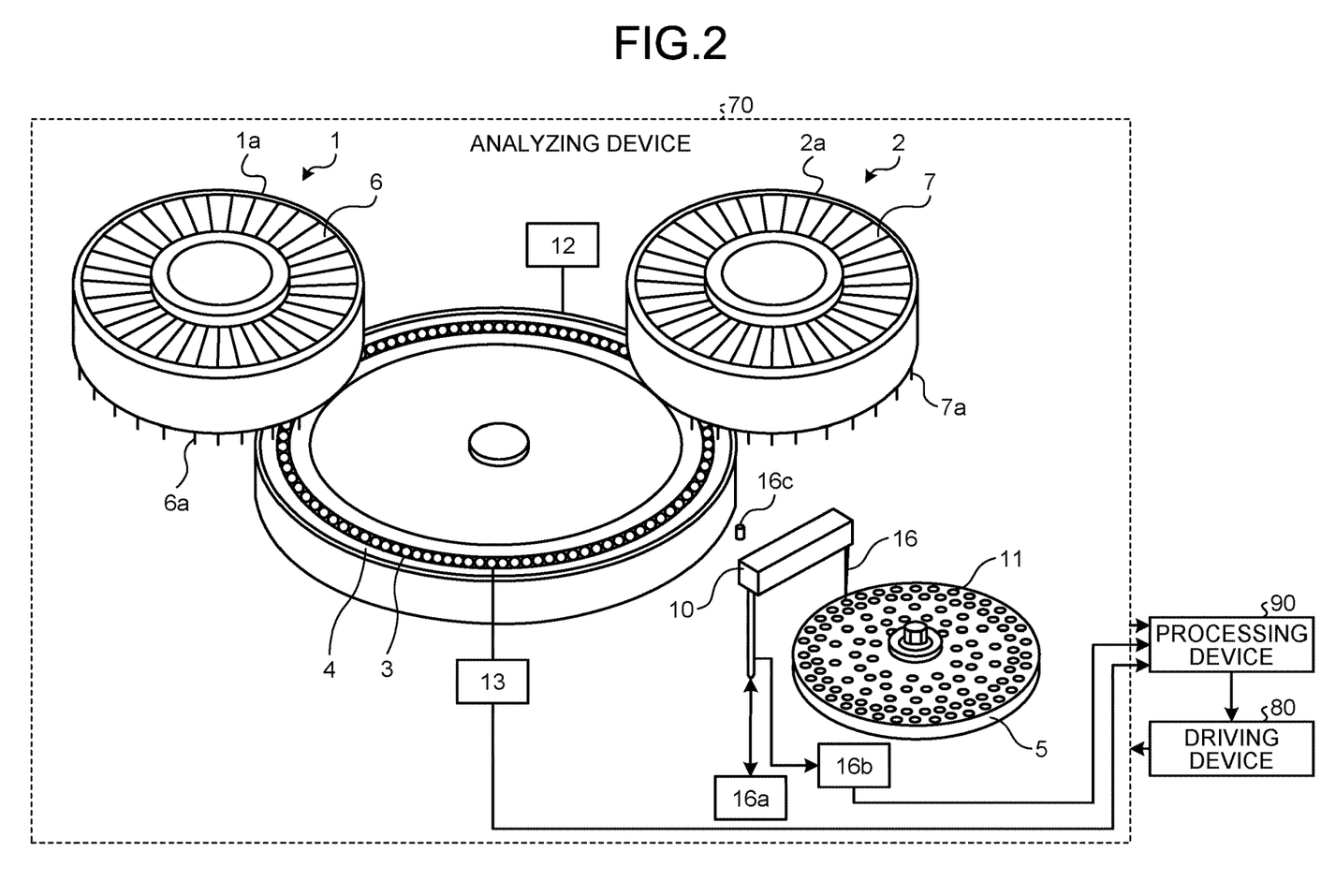
FIG. 2 is a perspective view illustrating an example of a configuration of an analyzing device of the automatic analyzing device illustrated in FIG. 1.

FIG. 2 is a perspective view illustrating an example of the configuration of the analyzing device 70 of the automatic analyzing device 100 illustrated in FIG. 1.

The analyzing device 70 includes a sample disk 5 that holds a plurality of sample containers 11. The sample container 11 houses therein a sample such as a standard sample or a test sample of each inspection item.

The analyzing device 70 further includes a plurality of reaction cuvettes 3 disposed on a circumference and a reaction disk 4 that holds the reaction cuvettes 3 in a rotatable manner.

The analyzing device 70 further includes a sample dispensing probe 16, a sample dispensing arm 10, a sample dispensing pump 16a, a sample detector 16b, and a washing tub 16c. The sample dispensing probe 16 dispenses a sample. Specifically, the sample dispensing probe 16 aspirates the sample in the sample container 11 held on the sample disk 5 for each of the inspection items, and dispenses the sample into the reaction cuvette 3 in an amount set as an analysis parameter of the corresponding inspection item. That is, the sample dispensing probe 16 dispenses samples to the reaction cuvette 3. The sample dispensing probe 16 is an example of a sample dispensing unit. The sample dispensing arm 10 supports the sample dispensing probe 16 to be rotatable and movable up and down. The sample dispensing pump 16a causes the sample dispensing probe 16 to aspirate and dispense the sample. The sample detector 16b determines that the sample in the sample container 11 is detected, when a tip part of the sample dispensing probe 16 moving down from the upper liquid surface contacts the liquid surface of the sample in the sample container 11 held on the sample disk 5. Specifically, the sample detector 16b is electrically connected to the sample dispensing probe 16, and detects the liquid surface of the sample in the sample container 11 by a change in the electrostatic capacitance when the tip part of the sample dispensing probe 16 contacts the sample in the sample container 11. When the liquid surface of the sample in the sample container 11 is detected, the sample dispensing pump 16a causes the sample dispensing probe 16 to aspirate and dispense the sample. The washing tub 16c washes the sample dispensing probe 16 every time dispensing of the sample ends.

The analyzing device 70 further includes a plurality of reagent cartridges 6, a reagent storage 1 that stores therein the reagent cartridges 6, a plurality of reagent cartridges 7, and a reagent storage 2 that stores therein the reagent cartridges 7. The reagent cartridges 6 and 7 house therein the reagents containing components that react with the components of each of the inspection items included in the sample. The reagent storage 1 includes a reagent rack 1a that is a turntable that holds the reagent cartridges 6 of each of the inspection items in a rotatable manner. The reagent storage 2 includes a reagent rack 2a that is a turntable that holds the reagent cartridges 7 of each of the inspection items in a rotatable manner.

Before being transported, reagents are contained in the reagent cartridges 6 and 7, and the reagent cartridges 6 and 7 after being transported are stored in the reagent storages 1 and 2, respectively. The reagent cartridges 6 and 7 dispense the reagents in an amount set as the analysis parameter of the inspection item into the reaction cuvettes 3 by respective reagent supply probes 6a and 7a.

The analyzing device 70 further includes a measurement unit 13 and a reaction cuvette washing unit 12. The measurement unit 13 emits light to the reaction cuvette 3 that houses therein a liquid mixture mixed by a mixer 17 and to the reaction cuvette 3 that houses therein a liquid mixture mixed by a mixer 19 so as to measure the liquid mixtures. Specifically, the measurement unit 13 emits light to the rotating reaction cuvette 3 at a measurement position, and detects, by the emission, the light transmitted through the sample and the liquid mixture of the sample in the reaction cuvette 3. Then, the measurement unit 13 processes detected signals to generate the standard data and the test data represented by digital signals, and outputs those to the processing circuitry 30 of the processing device 90. The reaction cuvette washing unit 12 washes the inside of the reaction cuvette 3 after measurement performed by the measurement unit 13 is ended.

The driving device 80 drives each of the units of the analyzing device 70.

The driving device 80 includes a mechanism for driving the sample disk 5 of the analyzing device 70, and rotates the sample containers 11. Furthermore, the driving device 80 includes a mechanism for driving the reagent rack 1a of the reagent storage 1, and rotates the reagent cartridges 6. The driving device 80 also includes a mechanism for driving the reagent rack 2a of the reagent storage 2, and rotates the reagent cartridges 7. Furthermore, the driving device 80 includes a mechanism for driving the reaction disk 4, and rotates the reaction cuvettes 3.

Furthermore, the driving device 80 includes a mechanism for rotating and moving up and down the sample dispensing arm 10, and moves the sample dispensing probe 16 between the sample container 11 and the reaction cuvette 3. Furthermore, the driving device 80 includes a mechanism that drives the sample dispensing pump 16a, and causes the sample dispensing probe 16 to dispense the sample. That is, the sample dispensing probe 16 is caused to aspirate the sample in the sample container 11 and to dispense the sample into the reaction cuvette 3.

The overall configuration of the automatic analyzing device 100 to which the reagent cartridge according to the embodiment is applied has been described heretofore. In order to improve the dispensing accuracy of the reagent in the automatic analyzing device 100 with a simple configuration, the reagent cartridge according to the embodiment includes the housing part, the tubular member, and the dispense part. The housing part houses therein the reagent. The tubular member is filled with the reagent housed in the housing part. The dispense part dispenses the reagent supplied from the tubular member. The tubular member has elasticity, and supplies the reagent to the dispense part when a side face part thereof is compressed.

Figure 3:
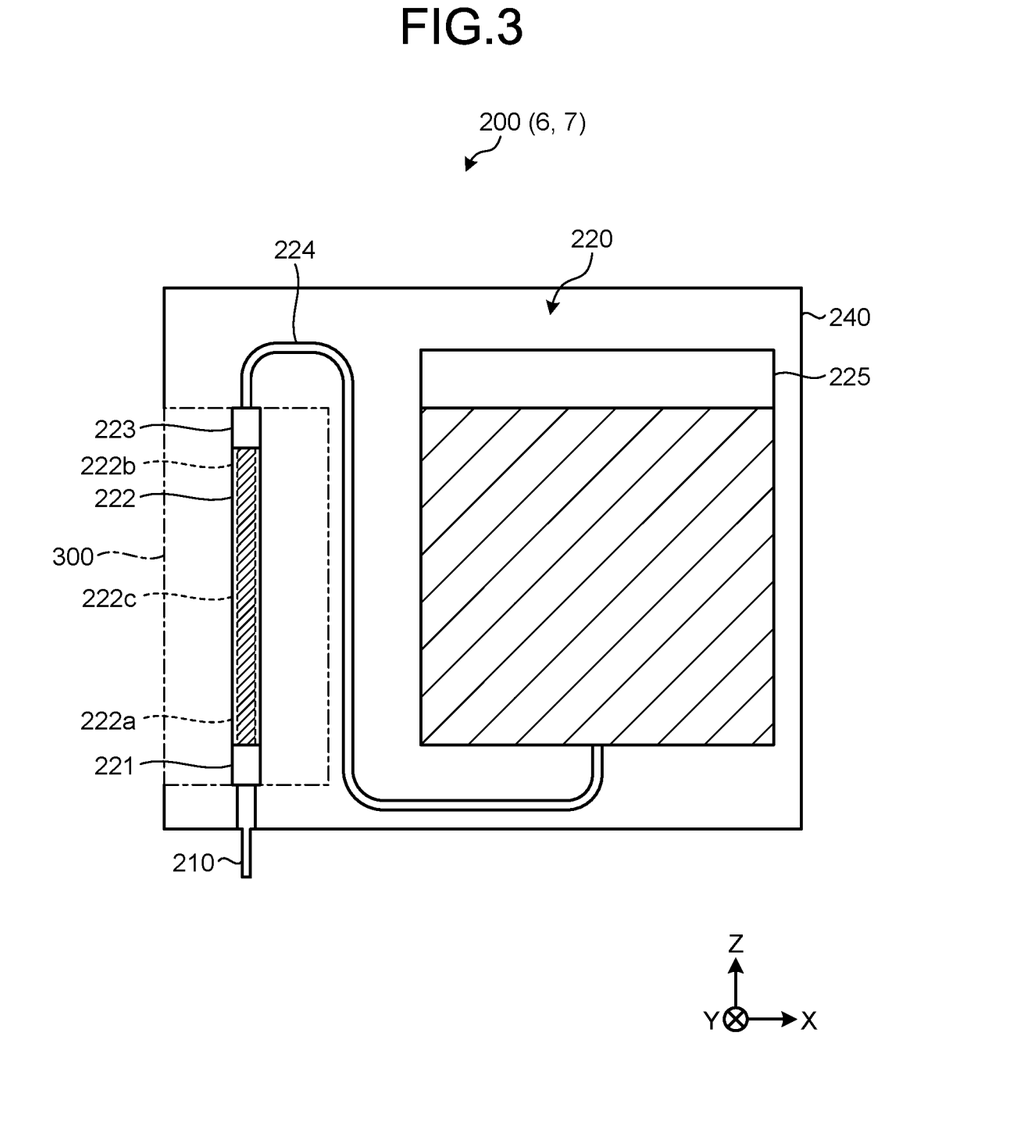
FIG. 3 is a diagram illustrating an example of a configuration of the reagent cartridge according to the embodiment.

FIG. 3 is a diagram illustrating an example of a configuration of a reagent cartridge 200 according to the embodiment. FIG. 3 illustrates an X-Z section of the reagent cartridge 200. The reagent cartridge 200 illustrated in FIG. 3 corresponds to the reagent cartridges 6 and 7 illustrated in FIG. 2.

As illustrated in FIG. 3, the reagent cartridge 200 according to the embodiment includes a reagent supply probe 210 and a reagent supply unit 220 built inside a case 240. The reagent supply probe 210 corresponds to the reagent supply probes 6a and 7a illustrated in FIG. 2, for example. The reagent supply probe 210 is an example of the dispense part.

The reagent supply unit 220 includes a check valve 221, a tube 222, a check valve 223, a tube 224, and a vessel 225. The tube 222 is an example of the tubular member. The check valve 221 is an example of a first valve, and the check valve 223 is an example of a second valve. The vessel 225 is an example of the housing part.

The vessel 225 houses therein a reagent. For example, the vessel 225 is formed with a metal or polymer material.

The tube 224 is provided between the check valve 223 and the bottom face part of the vessel 225. Specifically, the check valve 223 is connected to one end of the tube 224, and the bottom face part of the vessel 225 is connected to the other end of the tube 224 on the opposite side of the one end thereof.

The tube 222 is provided between the check valve 221 and the check valve 223. Specifically, the check valve 221 is connected to one end 222a of the tube 222, and the check valve 223 is connected to another end 222b of the tube 222 on the opposite side of the one end 222a. The tube 222 is formed with a member having elasticity.

The tube 222 is a soft tube such as a silicon tube or an OERLIKON (registered trademarks) tube.

The check valve 221 is provided between the tube 222 and the reagent supply probe 210. Specifically, the check valve 221 is provided between the one end 222a of the tube 222 and the end side of the reagent supply probe 210 on the opposite side of the tip part thereof. The check valve 221 is a non-return valve for preventing backflow from the reagent supply probe 210 in the direction to the tube 222.

The check valve 223 is provided between the tube 222 and the tube 224. Specifically, the check valve 223 is provided between the other end 222b of the tube 222 on the opposite side of the one end 222a and the one end of the tube 224. The check valve 223 is a non-return valve for preventing backflow from the tube 222 in the direction to the vessel 225 via the tube 224.

The check valve 223 allows the reagent to flow only in the direction of the tube 222 from the vessel 225 via the tube 224, and the check valve 221 allows the reagent to flow only in the direction of the reagent supply probe 210 from the tube 222. For example, the reagent within the vessel 225 is filled in the tube 222 from the tube 224 via the check valve 223. The reagent filled in the tube 222 is dispensed from the reagent supply probe 210 via the check valve 221 when a side face part 222c of the tube 222 is compressed.

Specifically, when the side face part 222c of the tube 222 is compressed, the check valve 221 dispenses the reagent filled in the tube 222 from the reagent supply probe 210. When the compression to the tube 222 is released, the check valve 223 fills the reagent in the tube 222 from the vessel 225 via the tube 224. Note here that the tube 222 has elasticity of such an extent that the shape thereof is deformed when the side face part 222c is compressed and that the shape thereof is restored when the compression to the side face part 222c is released. For example, the tube 222 is automatically filled with the reagent by the restoration of the shape of the tube 222 when the compression to the side face part 222c is released.

Note here that the side face part 222c is compressed mechanically or manually. In the manual case, the side face part 222c is compressed by fingers of the user, for example. In the mechanical case, a clip part 300 for compressing the side face part 222c is provided to the side face part 222c of the tube 222, for example. That is, the side face part 222c is compressed by the clip part 300. Hereinafter, the case of mechanically compressing the side face part 222c will be described as an example.

Figure 4:
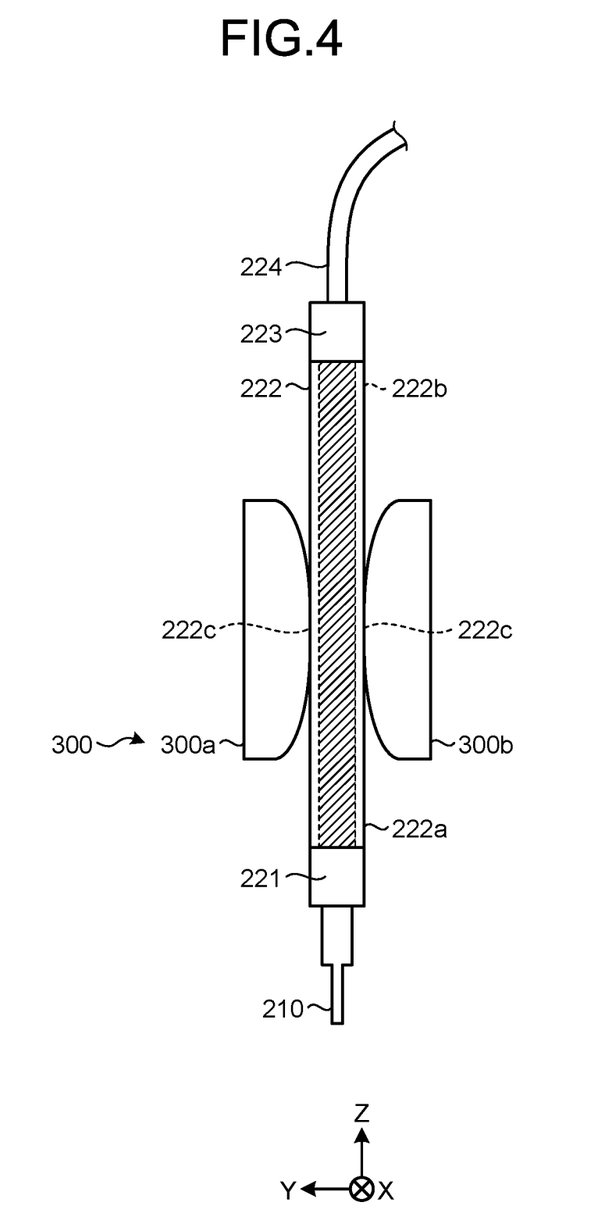
FIG. 4 is a diagram illustrating an example of a clip part according to the embodiment.

FIG. 4 is a diagram illustrating an example of the clip part 300 according to the embodiment. FIG. 4 illustrates a Y-Z section of the reagent cartridge 200 and the clip part 300. The clip part 300 includes a clip part 300a that compresses the side face part 222c of the tube 222 from a first direction that is an opposite direction of a Y direction, and a clip part 300b that compresses the side face part 222c of the tube 222 from a second direction that is the Y direction. The clip part 300 is an example of a compression part.

Figure 5:
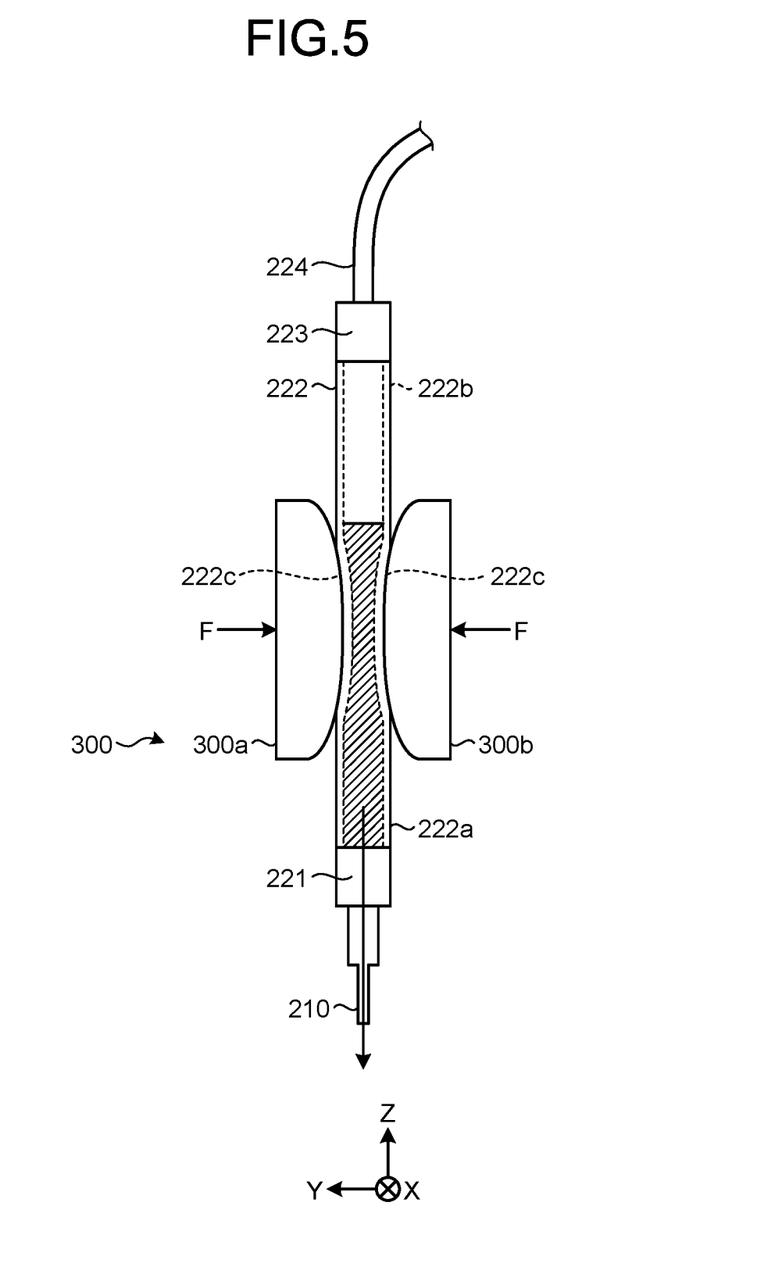
FIG. 5 is a diagram illustrating an example of reagent dispensing processing according to the embodiment.
Figure 6:
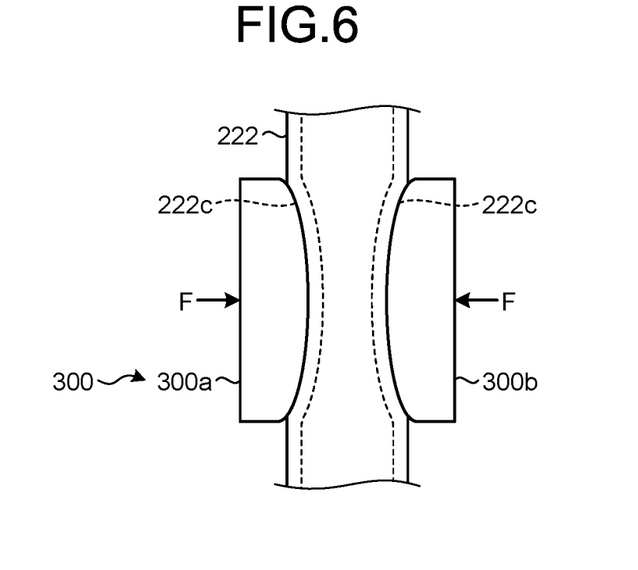
FIG. 6 is a diagram illustrating an example of the reagent dispensing processing according to the embodiment.
Figure 7:
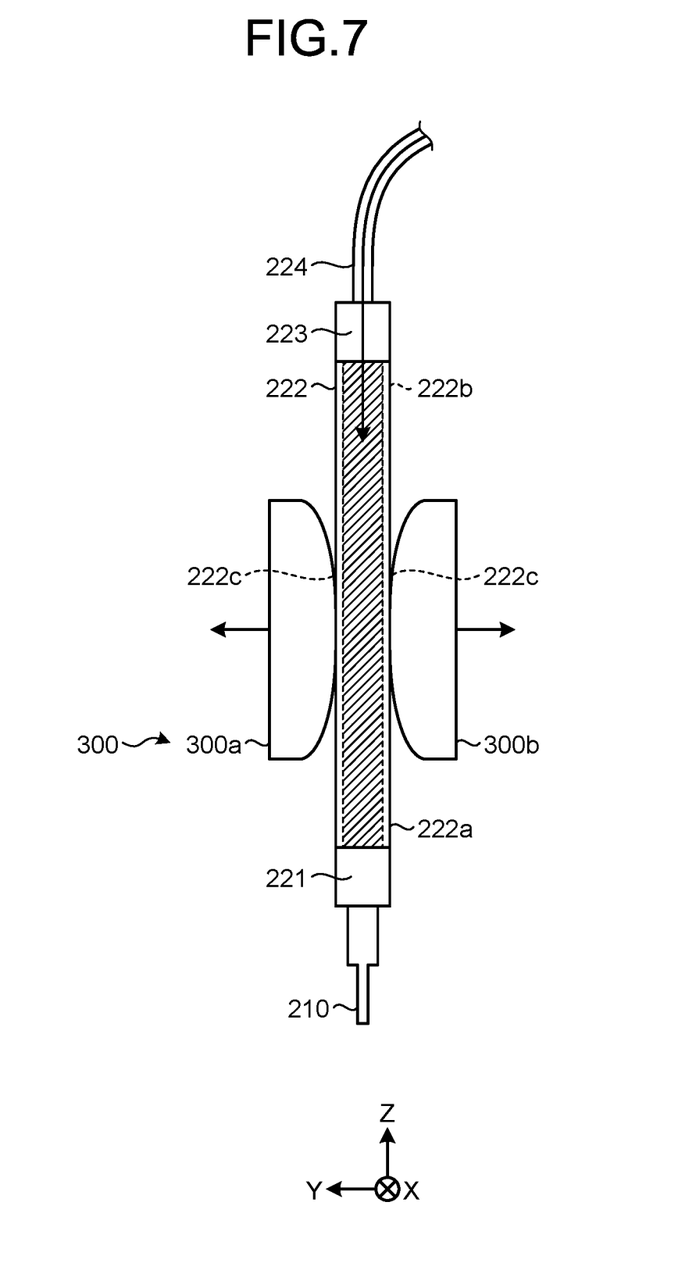
FIG. 7 is a diagram illustrating an example of the reagent dispensing processing according to the embodiment.

Next, reagent dispensing processing will be described by referring to FIG. 5 to FIG. 7. FIG. 5 to FIG. 7 are diagrams illustrating examples of the reagent dispensing processing according to the embodiment.

First, when the reagent is dispensed, the clip part 300 is connected to an external clipper (not illustrated) that is an arm for driving the clip part 300 from outside, for example. Specifically, the controlling function 32 of the processing device 90 outputs a control signal to the driving device 80 for moving the external clipper to be connected to the clip part 300. In this case, the driving device 80 moves the external clipper to be connected to the clip part 300 according to the control signal.

Next, the clip part 300 causes the reagent supply probe 210 to dispense the reagent in an amount appropriate for compression to the side face part 222c of the tube 222. Specifically, the controlling function 32 of the processing device 90 outputs a control signal to the driving device 80 for causing the clip part 300 to compress the side face part 222c of the tube 222 in a compression amount for dispensing a prescribed amount of reagent from the reagent cartridge 200, for example. In this case, the driving device 80 drives the external clipper connected to the clip part 300 according to the control signal for causing the clip part 300 to compress the side face part 222c of the tube 222 in a compression amount F illustrated in FIG. 5. That is, the driving device 80 compresses the side face part 222c of the tube 222 to dispense the reagent to the reaction cuvette 3. Then, as described above, the measurement unit 13 measures the liquid mixture of the sample and the reagent within the reaction cuvette 3.

Note here that the compression amount F includes parameters such as the force and speed when the prescribed amount of reagent is dispensed from the reagent cartridge 200. For example, the amount of reagent to be dispensed is set in advance for each inspection, so that the compression amount F is determined in accordance with the inspection to be performed.

As illustrated in FIG. 6, when the side face part 222c is compressed by the compression amount F, the shape of the tube 222 is deformed. At this time, the side face part 222c is compressed by the compression amount F to such an extent that the inside of the tube 222 is not crushed. For example, the side face part 222c of the tube 222 is compressed by the compression amount F to an extent of about ½ to ⅔. Furthermore, as illustrated in FIG. 5, when the side face part 222c of the tube 222 is compressed by the compression amount F, the reagent filled in the tube 222 is dispensed from the reagent supply probe 210 via the check valve 221. Specifically, the reagent in the amount corresponding to the extent of the compression to the side face part 222c of the tube 222 is dispensed from the reagent supply probe 210.

Next, the clip part 300 releases the compression to the side face part 222c of the tube 222. Specifically, the controlling function 32 of the processing device 90 outputs, to the driving device 80, the control signal for causing the clip part 300 to release the compression to the side face part 222c of the tube 222, for example. In this case, as illustrated in FIG. 7, the driving device 80 drives the external clipper connected to the clip part 300 according to the control signal to release the compression to the side face part 222c of the tube 222.

When the compression to the side face part 222c is released, the shape of the tube 222 is restored. At this time, if the shape of the tube 222 is restored, the check valve 223 fills the tube 222 with the reagent from the vessel 225 via the tube 224. That is, the tube 222 is automatically filled with the reagent by the restoration of the shape of the tube 222.

When dispensing of the reagent is completed, the controlling function 32 of the processing device 90 outputs, to the driving device 80, a control signal for releasing connection between the external clipper and the clip part 300, for example. In this case, the driving device 80 releases the connection between the external clipper and the clip part 300 according to the control signal.

Note that when the side face part 222c of the tube 222 is compressed mechanically, the tube 222 may be pressed indirectly even though the case of directly pressing the tube 222 is described in the above-described example.

For example, in the reagent cartridge 200, the tube 222 and the clip part 300 are housed in a tube housing part formed to sink in by an external force and the clip part 300 is indirectly pressed when the tube housing part is pressed by an external arm or the like, thereby compressing the side face part 222c of the tube 222.

Specifically, the controlling function 32 of the processing device 90 outputs, to the driving device 80, a control signal for moving the external arm to be in contact with the tube housing part of the reagent cartridge 200. In this case, the driving device 80 moves the arm to be in contact with the tube housing part according to the control signal. Then, the controlling function 32 of the processing device 90 outputs, to the driving device 80, a control signal for causing the arm to compress the side face part 222c of the tube 222 via the clip part 300 in a compression amount for dispensing a prescribed amount of reagent from the reagent cartridge 200, for example. In this case, the driving device 80 drives the arm according to the control signal to compress, by the arm, the side face part 222c of the tube 222 via the clip part 300 by the compression amount. Thereby, the reagent is dispensed into the reaction cuvette 3.

As described above, in the embodiment, the reagent supply probe 210 and the reagent supply unit 220 are built in the reagent cartridge 200. That is, in the reagent supply unit 220 of the embodiment, the vessel 225 houses therein the reagent, and the tube 222 is filled with the reagent that is housed in the vessel 225. The reagent supply probe 210 dispenses the reagent supplied from the tube 222. The tube 222 has elasticity, and supplies the reagent to the reagent supply probe 210 when the side face part 222c is compressed. Thereby, according to the embodiment, the dispensing accuracy of the reagent can be secured in the reagent cartridge 200. Furthermore, according to the embodiment, it is possible to simplify the system since a highly accurate pump unit becomes unnecessary for causing the dispensing probe to aspirate the reagent in the reagent container and to dispense the reagent into the reaction cuvette by improving the dispensing accuracy of the reagent with a simple configuration.

Furthermore, with the system that secures the dispensing accuracy of the reagent by the dispenser probe, the dispenser arm, and the pump unit, the reagent containers after being transported are stored in an open state in the reagent storage. Therefore, in such a system, the reagent tends to be in contact with air and easily deteriorated. In the embodiment, however, the dispensing accuracy of the reagent is secured in the reagent cartridge 200, so that the reagent cartridge 200 can be stored in the reagent storage in an unopen state after the reagent containers are transported. Therefore, with the reagent cartridge 200 according to the embodiment, contact between the reagent and air can be avoided, so that the life of the reagent can be extended. Furthermore, with the reagent cartridge 200 according to the embodiment, it is possible to store the reagent at room temperatures while avoiding contact between the reagent and air, thereby enhancing the convenience. Room temperature storage is applied to a circulation process of products, when storing the products at a place of use, and when storing the products to the reagent storage, so that it is effective in terms of convenience.

OTHER EMBODIMENTS

While the embodiment is described heretofore, various kinds of different forms other than the above-described embodiment may be applied as well.

First Modification

In the embodiment, the clip part 300 causes the reagent supply probe 210 to dispense the reagent in the amount corresponding to the extent of the compression to the side face part 222c of the tube 222. However, the configuration is not limited thereto. For example, in a first modification of the embodiment, the clip part 300 may cause the reagent supply probe 210 to dispense the reagent in the amount corresponding to a contact area between the side face part 222c and the clip part 300 when the side face part 222c of the tube 222 is compressed.

Figure 8:
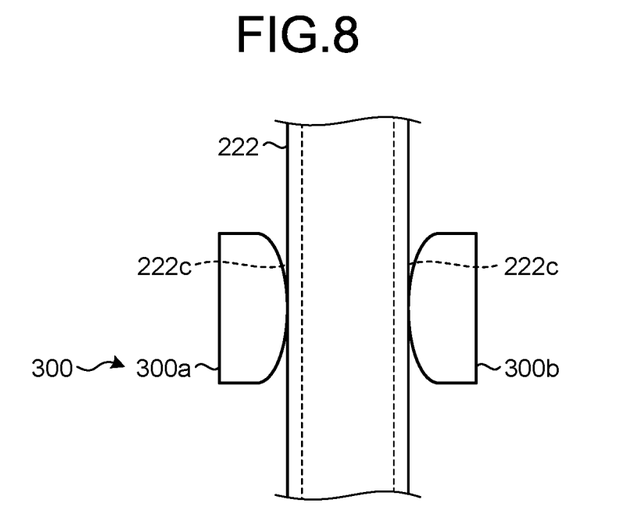
FIG. 8 is a diagram illustrating an example of reagent dispensing processing according to a first modification of the embodiment.
Figure 9:
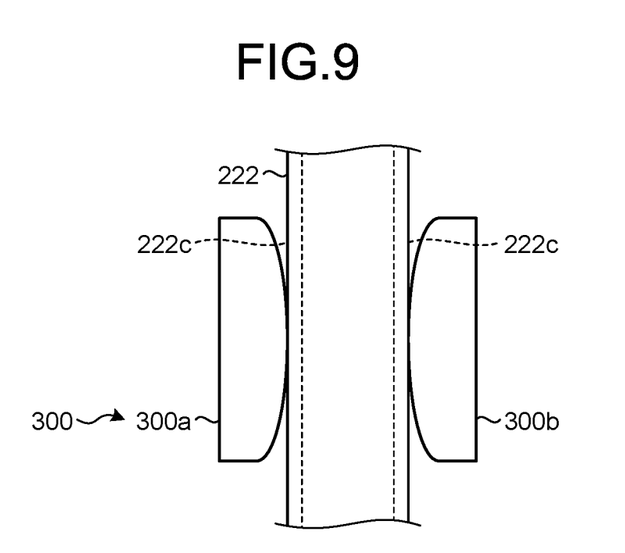
FIG. 9 is a diagram illustrating an example of the reagent dispensing processing according to the first modification of the embodiment.

The concept of dispensing the reagent in the amount corresponding to the contact area between the side face part 222c and the clip part 300 when the side face part 222c is compressed will be described by referring to FIG. 8 and FIG. 9. For example, assuming that the moving distance of the clip part 300 when the side face part 222c is compressed is the same between FIG. 8 and FIG. 9, the compression amount F is greater in FIG. 9 where the contact area between the side face part 222c and the clip part 300 is larger than that in FIG. 8, so that the dispensing amount of the reagent can be increased. That is, since the contact area between the side face part 222c and the clip part 300 and the amount of the reagent to be dispensed is in a proportional relationship, the reagent in the amount corresponding to the contact area is dispensed from the reagent supply probe 210.

Second Modification

In the embodiment, the tube 222 has elasticity of such an extent that the shape thereof is deformed when the side face part 222c is compressed and that the shape thereof is restored when the compression to the side face part 222c is released. However, the configuration is not limited thereto. For example, in a second modification of the embodiment, the tube 222 may include a member that suppresses plastic deformation of the tube 222, as will be described hereinafter, in order to suppress deterioration of the tube 222 over time (that is, reduction in restoring force) caused through a plurality of number of times of dispense. With such a configuration, the life of the tube can be extended.

The member for suppressing the plastic deformation of the tube 222 will be described herein by referring to FIG. 10 to FIG. 16.

Figure 10:
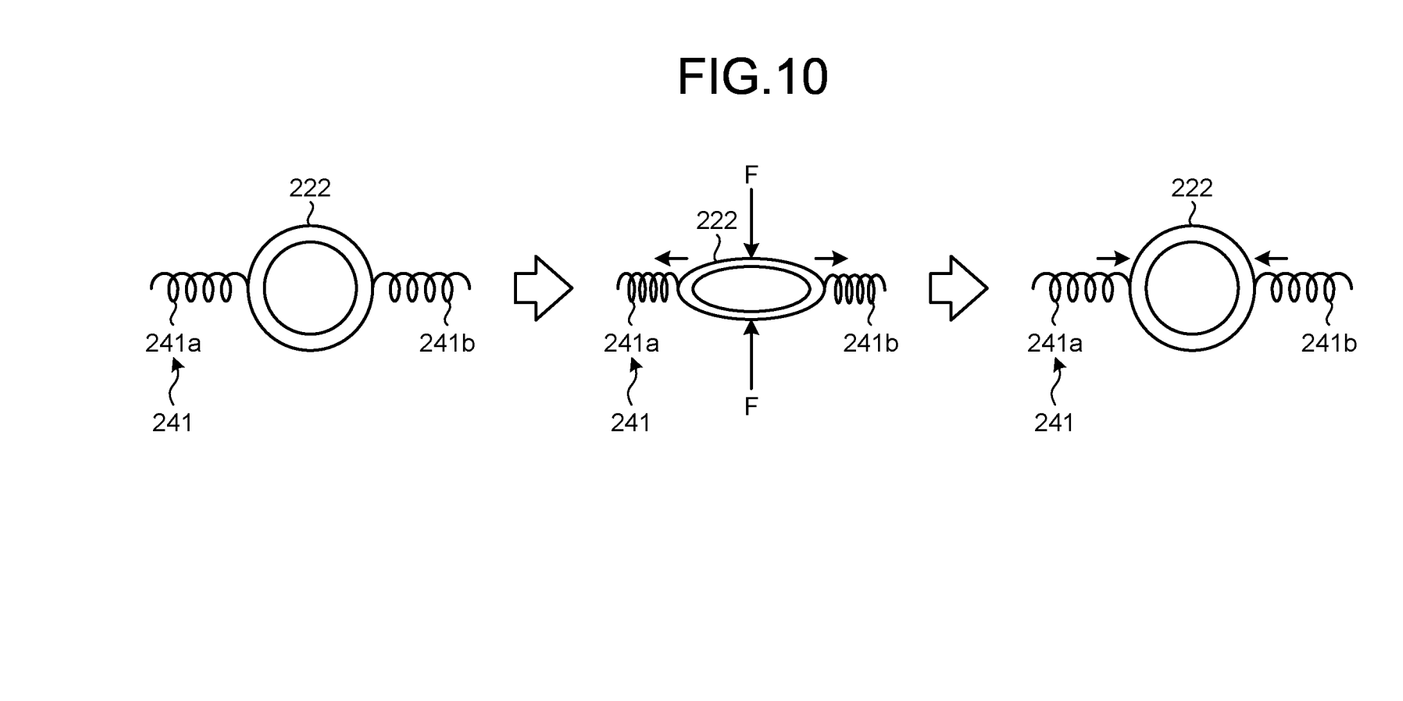
FIG. 10 is a diagram illustrating an example of reagent dispensing processing according to a second modification of the embodiment.

For example, as illustrated in FIG. 10, a spring 241 as a member for suppressing the plastic deformation of the tube 222 is provided to the side face part 222c of the tube 222, and the spring 241 includes spring parts 241a and 241b provided at positions where the clip part 300 is not provided. It is assumed herein that the side face part 222c of the tube 222 is compressed by the clip part 300 from a first direction that is the direction from the upper side of the drawing toward the lower side and from a second direction that is the direction from the lower side of the drawing toward the upper side, for example. In this case, as illustrated in FIG. 10, plastic deformation of the tube 222 is suppressed from a third direction that is a direction from the left side of the drawing toward the right side and from a fourth direction that is a direction from the right side of the drawing toward the left side in the section of the tube 222 by the energizing force of the spring part 241a and the spring part 241b.

Figure 11:
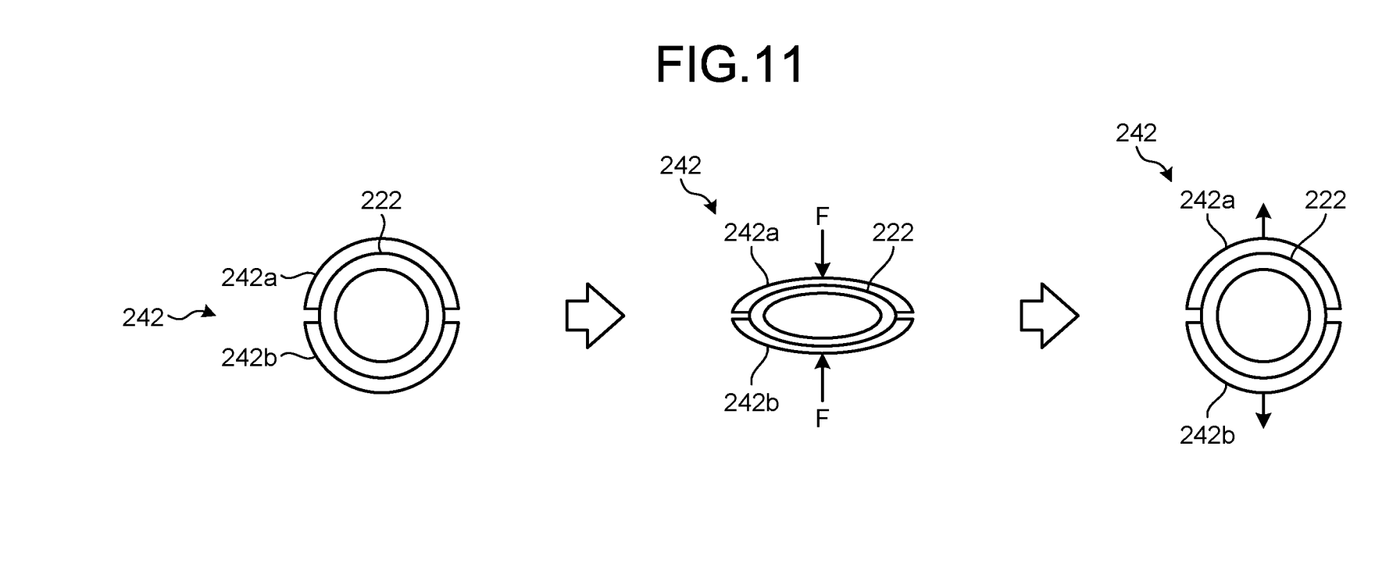
FIG. 11 is a diagram illustrating an example of the reagent dispensing processing according to the second modification of the embodiment.

For example, as illustrated in FIG. 11, a leaf spring 242 as a member for suppressing the plastic deformation of the tube 222 is provided to the side face part 222c of the tube 222, and the leaf spring 242 includes leaf spring parts 242a and 242b provided at positions where the clip part 300 is not provided. That is, the clip part 300 is provided to the side face part 222c of the tube 222 via the leaf spring 242. It is assumed herein that the side face part 222c of the tube 222 is compressed by the clip part 300 from the first direction that is the direction from the upper side of the drawing toward the lower side and from the second direction that is the direction from the lower side of the drawing toward the upper side, for example. In this case, as illustrated in FIG. 11, plastic deformation of the tube 222 is suppressed from the second direction that is the direction restoring from the first direction and from the first direction that is the direction restoring from the second direction by the energizing force of the leaf spring part 242a and the leaf spring part 242b.

Figure 12:
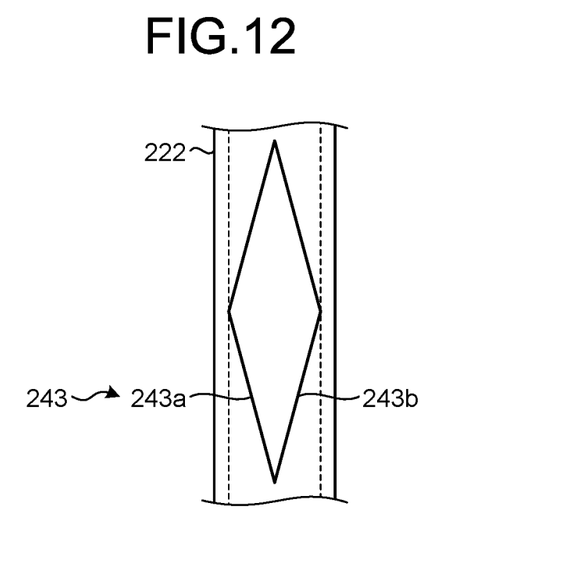
FIG. 12 is a diagram illustrating an example of the reagent dispensing processing according to the second modification of the embodiment.

While the plastic deformation of the tube 222 is suppressed by an outer-type spring such as the leaf spring 242, the plastic deformation of the tube 222 may also be suppressed by an inner-type spring such as a leaf spring 243 as illustrated in FIG. 12, for example. For example, as illustrated in FIG. 12, the leaf spring 243 as a member for suppressing the plastic deformation of the tube 222 is provided on the inner side of the side face part 222c of the tube 222, and the leaf spring 243 includes leaf spring parts 243a and 243b. The leaf spring parts 243a and 243b correspond to the leaf spring parts 242a and 242b of FIG. 11.

Figure 13:
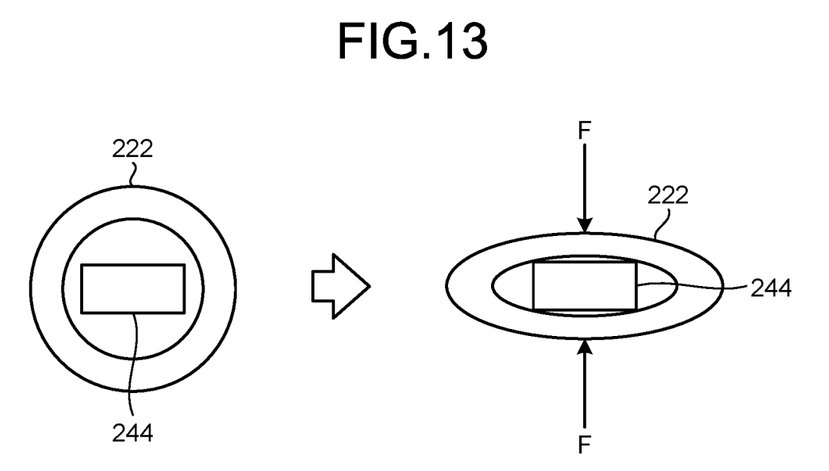
FIG. 13 is a diagram illustrating an example of the reagent dispensing processing according to the second modification of the embodiment.

Furthermore, as illustrated in FIG. 13, a suppression member 244 for suppressing the plastic deformation of the tube 222 may be built-in on the inner side of the side face part 222c of the tube 222.

Figure 14:
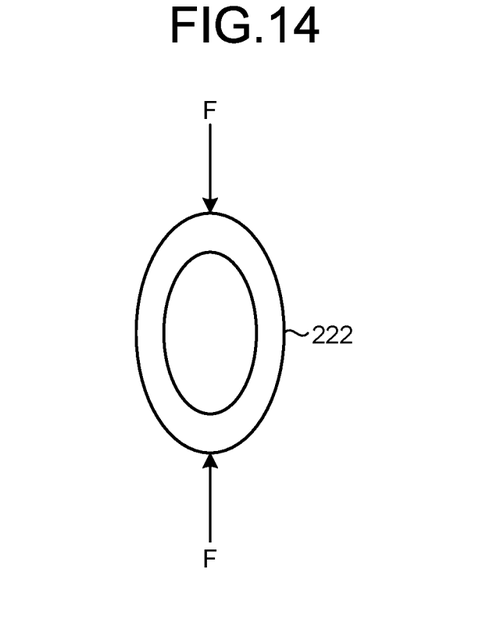
FIG. 14 is a diagram illustrating an example of the reagent dispensing processing according to the second modification of the embodiment.
Figure 15:
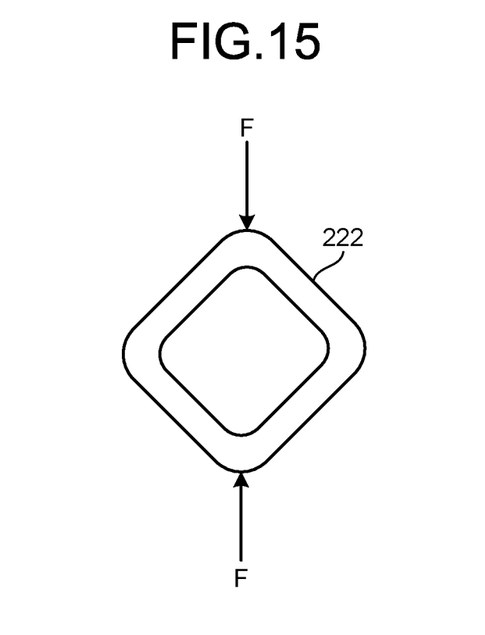
FIG. 15 is a diagram illustrating an example of the reagent dispensing processing according to the second modification of the embodiment.

Furthermore, as illustrated in FIG. 14 and FIG. 15, the shape of the section of the tube 222 may be changed in order to suppress the plastic deformation of the tube 222. For example, the shape of the section of the tube 222 may be changed from a circular shape to an elliptic shape as illustrated in FIG. 14, or may be changed to a polygonal shape such as a quadrilateral shape as illustrated in FIG. 15.

Figure 16:
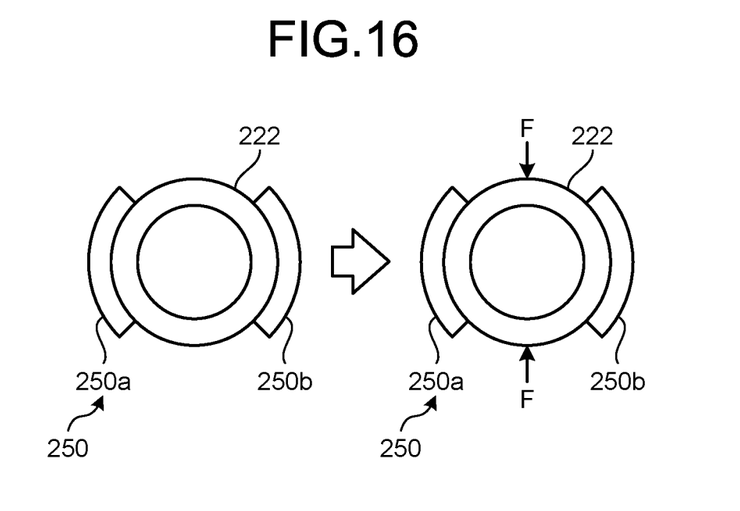
FIG. 16 is a diagram illustrating an example of the reagent dispensing processing according to the second modification of the embodiment.

Furthermore, as illustrated in FIG. 16, a suppression member 250 for suppressing the plastic deformation of the tube 222 may be attached to the side face part 222c of the tube 222. The suppression member 250 includes members 250a and 250b provided at positions where the clip part 300 is not provided. When the side face part 222c of the tube 222 is compressed by the clip part 300, the tube 222 is deformed only at the part where the clip part 300 is provided, due to the suppression member 250.

As described above, in the second modification of the embodiment, it is possible to suppress the plastic deformation of the tube 222 caused through a plurality of number of times of dispense by providing the members illustrated in FIG. 10 to FIG. 16 described above to the tube 222. Furthermore, in the second modification of the embodiment, the tube 222 includes the members for suppressing the plastic deformation, so that it is effective particularly in the case where the side face part 222c is compressed manually, for example.

According to at least one of the embodiments described above, the dispensing accuracy of the reagents can be improved with a simple configuration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reagent cartridge, comprising:
a housing to house therein a reagent;
a tubular member to be filled with the reagent housed in the housing;
a reagent supply probe to dispense the reagent supplied from the tubular member;
a leaf spring provided around a side face part of the tubular member;
a clip part provided around the leaf spring and configured to compress the side face part of the tubular member, wherein
the tubular member has elasticity, and supplies the reagent to the reagent supply probe when the side face part thereof is compressed; and
the clip part comprises a first clip part to compress the side face part of the tubular member from a first direction and a second clip part to compress the side face part of the tubular member from a second direction that is different from the first direction by 180 degrees.

2. The reagent cartridge according to claim 1, further comprising:
a first valve to prevent backflow from the reagent supply probe in a direction to the tubular member; and
a second valve to prevent backflow from the tubular member in a direction to the housing.

3. The reagent cartridge according to claim 1, wherein the tubular member has elasticity of such an extent that a shape of the tubular member is deformed when the side face part is compressed and that the shape of the tubular member is restored when the compression to the side face part thereof is released.

4. The reagent cartridge according to claim 3, wherein the tubular member is automatically filled with the reagent by restoration of the shape of the tubular member when the compression to the side face part is released.

5. The reagent cartridge according to claim 1, wherein the tubular member is a tube.

6. The reagent cartridge according to claim 1, wherein the side face part is compressed mechanically.

7. The reagent cartridge according to claim 1, wherein the side face part is compressed manually.

8. The reagent cartridge according to claim 1, wherein the clip part causes the reagent supply probe to dispense the reagent in an amount corresponding to an extent of the compression to the side face part of the tubular member.

9. The reagent cartridge according to claim 8, wherein the clip part causes the reagent supply probe to dispense the reagent in an amount corresponding to a contact area between the side face part and the clip part when the side face part of the tubular member is compressed.

10. The reagent cartridge according to claim 1, wherein the tubular member includes a member to suppress plastic deformation of the tubular member.

11. An automatic analyzing device, comprising:
the reagent cartridge according to claim 1;
a reaction cuvette;
a sample dispensing probe to dispense a sample to the reaction cuvette;
a driving device to dispense a reagent to the reaction cuvette by compressing the side face part of the tubular member of the reagent cartridge; and
a measurement device configured to measure a liquid mixture of the sample and the reagent in the reaction cuvette.

12. The automatic analyzing device according to claim 11, further comprising a controlling device configured to output, to the driving device, a control signal to compress the side face part of the tubular member by a compression amount for dispensing a prescribed amount of the reagent from the reagent cartridge, wherein
the driving device compresses the side face part by the compression amount according to the control signal to dispense the reagent to the reaction cuvette.

13. The reagent cartridge according to claim 2, wherein the tubular member has elasticity of such an extent that a shape of the tubular member is deformed when the side face part is compressed and that the shape of the tubular member is restored when the compression to the side face part thereof is released.

* * * * *